US008694563B1

(12) United States Patent
Cameron et al.

(10) Patent No.: US 8,694,563 B1
(45) Date of Patent: Apr. 8, 2014

(54) SPACE RECOVERY FOR THIN-PROVISIONED STORAGE VOLUMES

(75) Inventors: Douglas J. Cameron, Woodinville, WA (US); Hueichian Huang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 12/426,224

(22) Filed: Apr. 18, 2009

(51) Int. Cl.
*G06F 7/00* (2006.01)
*G06F 17/30* (2006.01)

(52) U.S. Cl.
USPC ............................................ 707/822; 707/812

(58) Field of Classification Search
None
See application file for complete search history.

(56) References Cited

U.S. PATENT DOCUMENTS

| 7,162,600 | B2* | 1/2007 | Kano et al. ................... 711/162 |
| 7,237,045 | B2* | 6/2007 | Beckmann et al. ............ 710/38 |
| 7,328,307 | B2* | 2/2008 | Hoogterp ...................... 711/114 |
| 7,711,897 | B1* | 5/2010 | Chatterjee et al. ............ 711/114 |
| 7,747,702 | B2* | 6/2010 | Anderson et al. ............. 709/219 |
| 8,200,871 | B2* | 6/2012 | Rangan et al. ................. 710/74 |
| 2007/0067588 | A1* | 3/2007 | Kano et al. .................... 711/162 |
| 2008/0320061 | A1* | 12/2008 | Aszmann et al. ............. 707/205 |
| 2009/0300301 | A1* | 12/2009 | Vaghani ........................ 711/162 |

\* cited by examiner

*Primary Examiner* — Augustine K. Obisesan
*Assistant Examiner* — Loan T Nguyen

(57) ABSTRACT

Methods are provided to write zeroes to logical blocks of a thin-provisioned volume mapped to a deleted file or a dummy file in the host file system. This causes the thin-provisioned volume to map these logical blocks to a common storage space that contains all zeroes so that storage space previously mapped to these logical blocks is free to be reused.

8 Claims, 8 Drawing Sheets

SPACE RECOVERY FOR THIN-PROVISIONED STORAGE VOLUMES

FIELD OF INVENTION

This invention relates to a method to eliminate the unnecessary usage of storage space in thin-provisioned storage volumes.

DESCRIPTION OF RELATED ART

FIG. 1 illustrates an exemplary storage server 100 coupled to a host computer 102. Storage server 100 includes controller nodes 104-1 and 104-2 each coupled to physical disk drives 106. Controller nodes 104-1 and 104-2 are interconnected by a primary high speed node-to-node link 108. Each controller node is coupled to host computer 102. Each controller node contains separate memory and processing complexes for data movement and control functions. Physical disk drives 106 are mounted in one or more drive magazines in one or more drive cages.

Pairing of controller nodes 104-1 and 104-2 is provided for clustering and redundancy. Additional pairs of controller nodes and additional physical disk drives may be added to scale up storage server 100. Software on controller nodes 104-1 and 104-2 virtualizes the storage space in physical disk drives 106 as virtual volumes and provides the virtual volumes as logical disks with logical blocks to host computer 102.

FIG. 2 illustrates an exemplary storage virtualization provided by controller nodes 104-1 and 104-2 to host computer 102. First, physical disk drives 106 are broken into "chunklets" of a uniform size. Second, the chunklets are organized into one or more logical disks with the desired RAID type, the desired layout characteristics, and the desired performance characteristics. Third, all or portions of a logical disk or multiple logical disks are organized into one or more virtual volumes. Soft copies of the virtual volume to logical disk mapping are saved in the random access memories (RAMs) of all the controller nodes. Soft copies of the logical disk to chunklet mapping are saved in the RAMs of the controller nodes for the node pair providing the primary and backup data service for each particular logical disk. Hard copies of the virtual volume to logical disk to chunklet mapping are saved in tables of contents on each physical disk drive or in one physical disk driver per drive magazine in storage server 100.

Further details of storage server 100 are provided in U.S. Pat. No. 6,658,478, entitled "Data Storage System," U.S. patent application Ser. No. 09/883,681, entitled "Node Controller for a Data Storage System," U.S. patent application Ser. No. 10/655,951, entitled "Time and Space Efficient Technique for Creating Virtual Volume Copies," U.S. Pat. No. 7,032,093, entitled "On-Demand Allocation of Physical Storage for Virtual Volumes," U.S. Pat. No. 6,823,442, entitled "Thin-Provisioning with Snapshot Technology," U.S. patent application Ser. No. 11/269,399, entitled "Region Mover," and U.S. patent application Ser. No. 11/269,024, entitled "Region Mover Application," which are all incorporated by reference in their entirety.

A storage volume, such as a virtual volume, may be thin-provisioned where only those logical blocks that have been written are mapped to storage space so that logical blocks that have not been written consume no storage space. If a logical block that has never been written (and is therefore not mapped to storage space) is read, data that is all zeroes is returned. This can save a lot of space in practice. There are two problems in practice that reduce the space savings from thin provisioning described above.

Thin-provisioned volumes operate at the block level and are generally ignorant of the file system running on the host. When a file is created, the file system maps the file to logical blocks in the thin-provisioned volume and writes the data for the file to the volume, which maps the logical blocks to storage space and writes the data to the storage space. When the file is deleted, the file is unlinked from the logical blocks and those blocks are marked as free in the file system. However, since the thin-provisioned volume is unaware of the file system structure, these logical blocks are still considered used from the point of view of the volume. This results in storage space being marked as used in the thin-provisioned volume that is actually free at the file system level. Note that the term "file system" includes application specific storage structures such as databases on raw volumes.

When one migrates storage from one volume to another (for example from one storage array to another), this is often done as volume-to-volume block copy that is below the file system (and therefore unaware of the file system structure). This block copy operation will read all the logical blocks in the source volume and write those logical blocks to the destination volume, even if those logical blocks have never been written on the source, or have been written but are now marked free at the file system level. This will cause the destination thin-provisioned volume to allocate storage space for these unused logical blocks.

SUMMARY

In one embodiment of the invention, methods are provided to write zeroes to logical blocks in a thin-provisioned volume that are mapped to a deleted file in a host file system, or to logical blocks in the thin-provisioned volume that are mapped to a dummy file in the host file system. This causes the thin-provisioned volume to map these logical blocks to a common storage space that contains all zeroes so that storage space previously mapped to these logical blocks is free to be reused.

In one embodiment, the deletion of a file in the host file system causes a SCSI write-same command with a data block of zeroes to be issued to the logical blocks previously mapped to the file. In another embodiment, the creation of a dummy file having all zeroes causes data blocks of zeroes to be written to the unused logical blocks previously mapped to now deleted files. In either embodiment, the logical blocks with all zeroes are mapped to a common storage space with all zeroes so any reads of those logical blocks will return all zeroes, and the storage space previously mapped to them is free to be reused.

BRIEF DESCRIPTION OF THE DRAWINGS

Use of the same reference numbers in different figures indicates similar or identical elements.

DETAILED DESCRIPTION

Embodiments of the present disclosure eliminate the unnecessary usage of storage space in a thin-provisioned volume by providing mechanisms that write zeroes to logical blocks in the thin-provisioned volume that are mapped to a deleted file or a dummy file in the host file system. In response, the thin-provisioned volume maps these logical blocks to a common storage space that contains all zeroes and the storage space previously mapped to these logical blocks is free to be reused.

Figure 1:
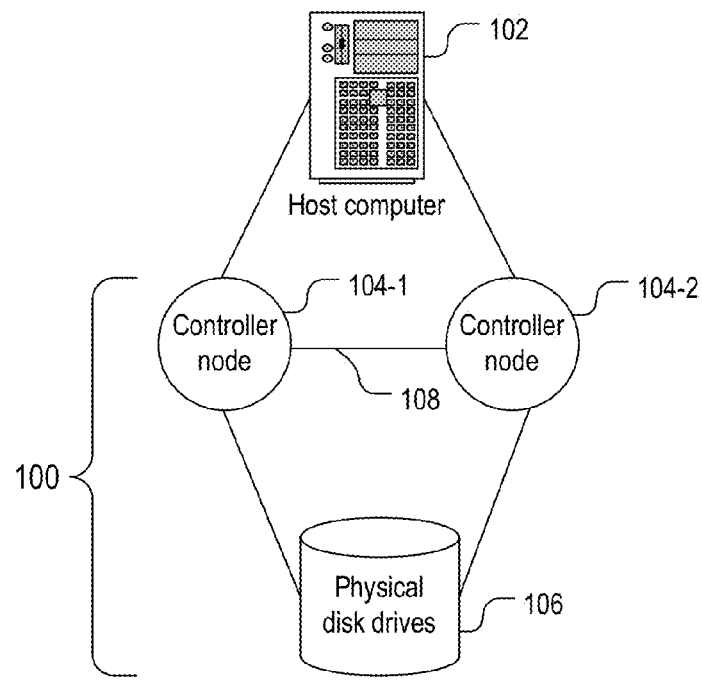
FIG. 1 illustrates a storage server coupled to a host computer.
Figure 2:
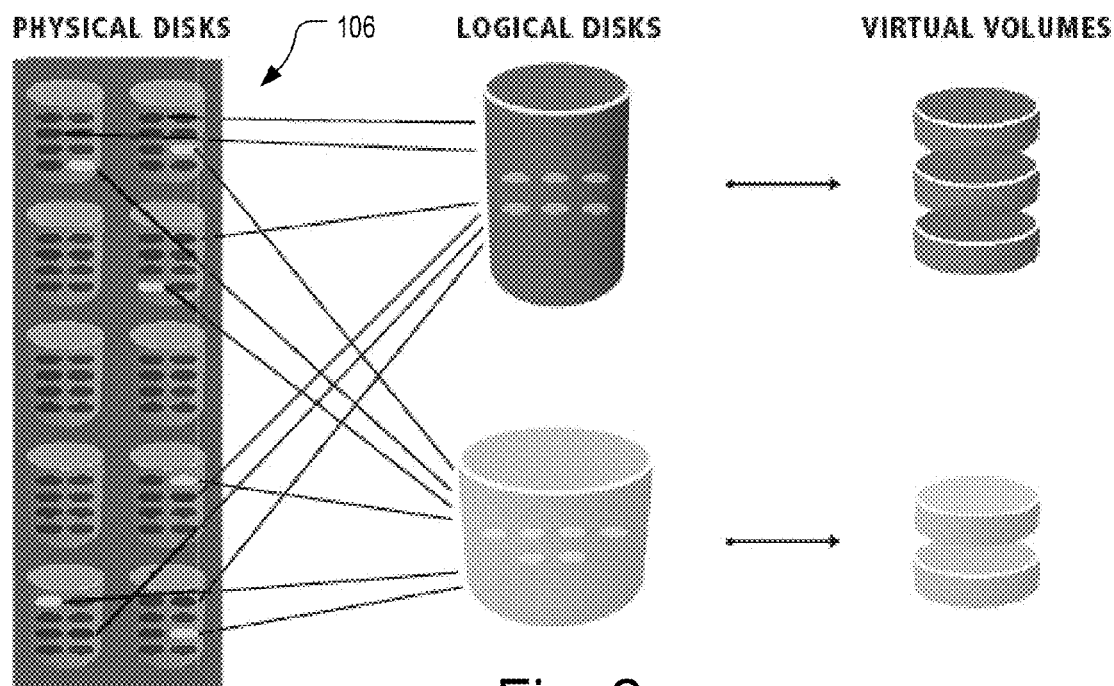
FIG. 2 illustrates virtualization of physical storage presented by the storage server to the host computer.
Figure 3:
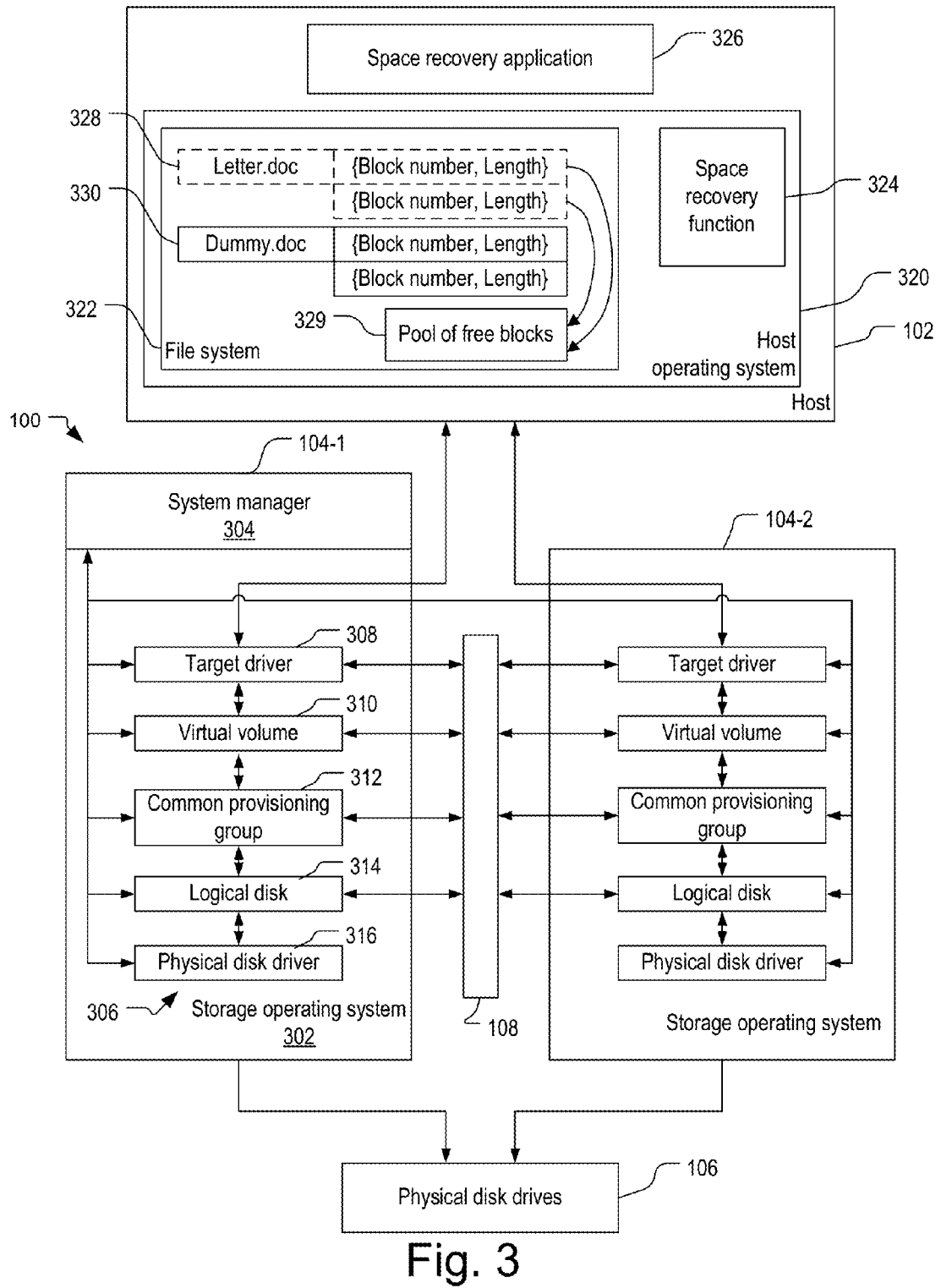
FIG. 3 illustrates the software architecture of a system in one embodiment of the invention.

FIG. 3 illustrates the software architecture of a system 300 that eliminates the unnecessary usage of storage space in thin-provisioned virtual volumes in one embodiment of the invention. System 300 includes storage server 100 and host computer 102. In storage server 100, controller node 104-1 executes an operating system 302 and a system manager 304 residing above the operating system. Operating system 302 has a data stack 306 consisting of a target driver 308, a virtual volume layer 310, common provisioning group (CPG) layer 312, a logical disk layer 314, and a physical disk driver 316. Operating system 302 presents a virtual volume or a partition of the virtual volume to host computer 102.

Physical disk driver 316 organizes physical disk drives 106 into a pool of chunklets. In one embodiment, each chunklet is 256 megabytes of contiguous disk space. Although physical disk drives are disclosed, physical disk driver 316 can organize other physical storage devices into a pool of physical storage regions.

Logical disk layer 314 organizes the chunklets into logical disk regions (LD regions), and LD regions into logical disks based on the RAID type, drive type, radial placement, and stripe width to achieve the desired cost, capacity, performance, and availability characteristics. In one embodiment, an LD region is 256 megabytes of logical disk storage space.

Virtual volume layer 310-1 divides up each LD region into pages for storing information (address tables and data). In one embodiment, a page has a size of 16 kilobytes and holds thirty-two 512 byte data blocks. Virtual volume layer 310 maps a logical block in a virtual volume ("VV block") to a block in a page of a LD region ("LD block").

CPG layer 312 allows logical disks to be allocated to virtual volumes on an as-needed basis. CPG layer 312 allows the user to create a CPG with one or more logical disks that provide a buffer pool of free LD regions, and a thin-provisioned virtual volume ("TPVV") associated to the CPG. When the TPVV is created, only a fraction of its exported virtual capacity is mapped to the LD regions. As application writes deplete the mapped LD regions to the TPVV, CPG layer 312 assigns additional LD regions from the LD region buffer pool to the TPVV. Over time, as the LD region buffer pool runs low, CPG layer 312 creates additional logical disks to replenish LD regions in the LD region buffer pool.

Target driver 308 communicates virtual volume read/write requests from host computer 102 to virtual volume layer 310. In one embodiment, the read/write requests follow the SCSI protocol. Although not shown, operating system 302 may provide higher level network data services including NFS, CIFS, and HTTP to allow file system export over native TCP/IP network services.

Similarly, controller node 104-2 executes an operating system with a data stack consisting of a target driver, a virtual volume layer, a CPG layer, a logical disk layer, and a physical disk driver. Components of the data stacks communicate by node-to-node link 108.

System manager 304 resides only on one of the controller nodes of data storage system 100. System manager 304 keeps a single system image of storage server 100. System manager 304 also services events from the data stacks, delivers configuration commands to the data stacks, and records system configuration information, including the physical disk to logical disk to virtual volume mapping, on one or more physical disk drives.

Host computer 102 includes an operating system 320 with a file system 322. File system 322 maps each file to one or more ranges of VV blocks in a virtual volume or a partition of the virtual volume. A range of VV blocks is represented by a paring of a starting block number and a length (e.g., the number of VV blocks in this range). A deleted file 328 is illustrated in phantom. When file 328 is deleted, file system 322 unlinks the VV blocks from the file and places the VV blocks in a pool 329 of free VV blocks that can be assigned to new data (e.g., a new file). In one embodiment, operating system 320 includes a space recovery function 324 that eliminates the unnecessary usage of storage space in a thin-provisioned virtual volume by issuing SCSI write-same commands with a data block of zeroes. In another embodiment, a space recovery application 326 above operating system 320 eliminates the unnecessary usage of storage space in thin-provisioned virtual volumes by creating a dummy file 330 with all zeroes. The details of space recovery function 324 and application 326 are described later in reference to FIGS. 8 and 9, respectively.

Figure 4:
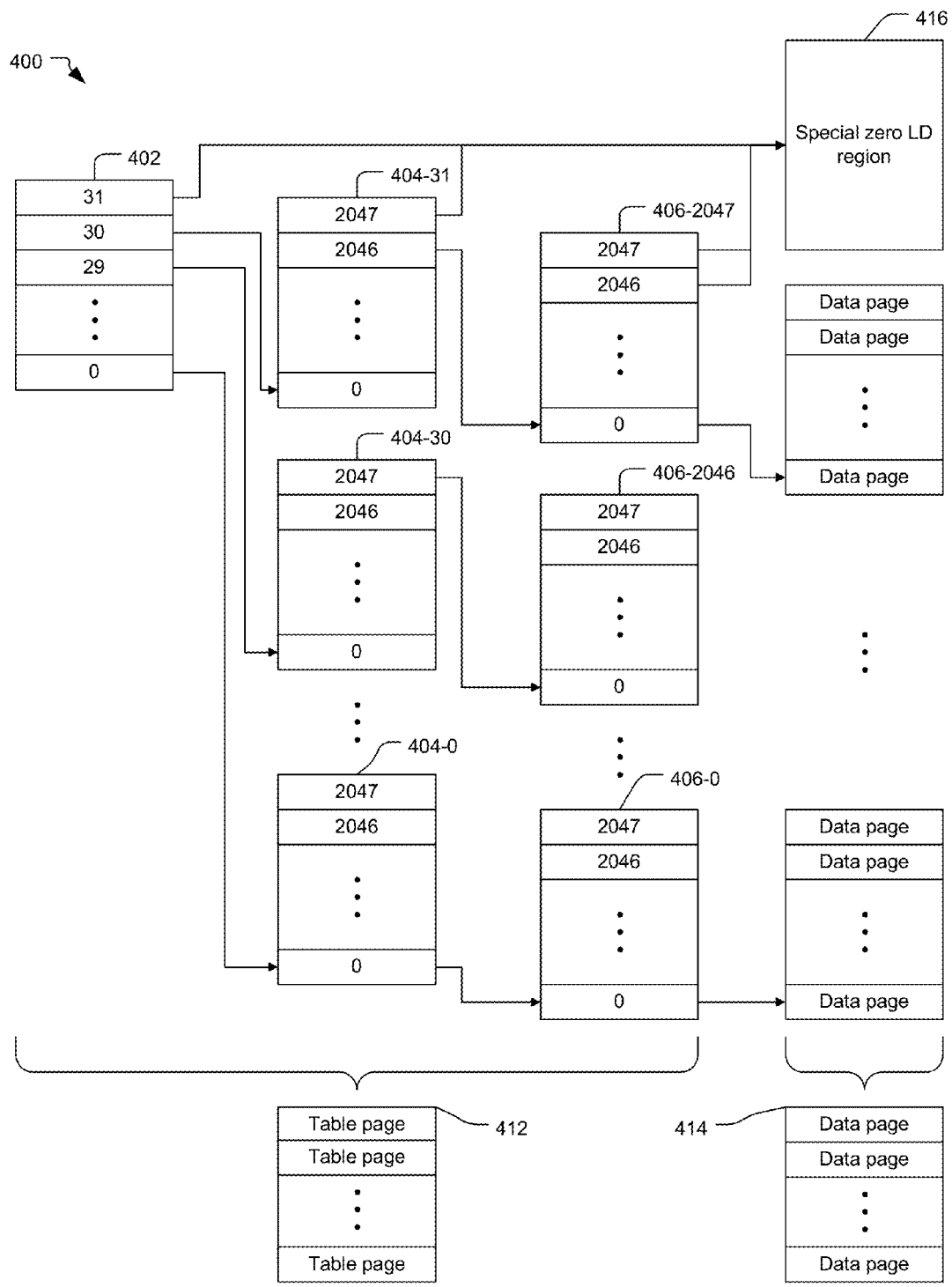
FIG. 4 illustrates a representation of the mapping of pages in a virtual volume to pages in a logical disk in one embodiment.

FIG. 4 illustrates a thin-provisioned virtual volume 400 in one embodiment of the invention. Virtual volume 400 is an exception list made up of address tables that map a page in the virtual volume ("VV page") to a data page in an LD region ("LD data page"). Virtual volume 400 includes buffer pools 412 and 414 of free LD pages from which the address tables and the LD data pages are allocated, respectively. In one embodiment, virtual volume 400 is implemented using the exception list to track changes to a dummy base volume consisting of only zeroes. As discussed before, CPG layer 312 may assign additional LD regions to LD page buffer pools 414 and 414 from its LD region buffer pool when LD pages are depleted.

The address tables are divided into three levels. This is because virtual volume 400 is written or read in logical blocks each identified by a virtual volume logical block address ("VV LBA"). Note that the block numbers used by file system 322 to address the VV blocks may not be identical to the VV LBAs of the VV blocks when a partition of a virtual volume is presented to host computer 102. For example, the block numbers may be offset by the start of the partition in the virtual volume to obtain the VV LBAs of the VV blocks.

Figure 5:
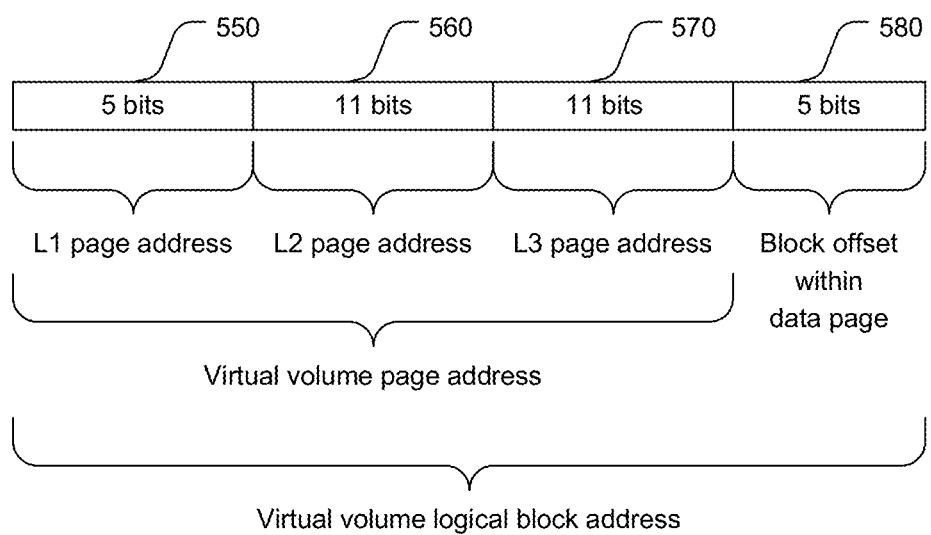
FIG. 5 illustrates a virtual volume logical block address and its component segments in one embodiment of the invention.

The VV LBA includes a virtual volume page address ("VV page address") consisting of parts 550, 560, and 570 (FIG. 5), and a block offset 580 (FIG. 5). Parts 550, 560, and 570 lead to a VV page, which is mapped to a LD data page. Block offset 580 leads to an LD block in the corresponding page in the LD region.

A level 1 table (e.g., table 402) consists of entries that can be indexed by the first part 550 of the VV page address. Specifically, part 550 provides an offset from the start of the level 1 table. Each entry in the level 1 table can store a pointer to the start of a level 2 table that shares the first part of the page address.

Each of the level 2 tables (e.g., table 404-0 to 404-31) consists of entries that can be indexed by the second part 560 of the VV page addresses. Specifically, part 560 provides an offset from the start of a level 2 table. Each entry in the level 2 table can store a pointer to the start of a level 3 table that shares the first and the second part of the page address.

Each of the level 3 tables (e.g., tables 406-0 to 406-2047 in one embodiment) consists of entries that can be indexed by the third part 570 of the VV page addresses. Specifically, part 570 provides an offset from the start of a level 3 table. Each entry in the level 3 table can store a pointer to an LD data page in an LD region.

Part 580 of the VV LBA identifies an offset of a data block (i.e., block offset) from the start of the LD data page. Accordingly, the VV LBA maps a VV block to an LD block. Although a specific size for the VV LBAs is illustrated in FIGS. 4 and 5, larger VV LBAs may be used by expanding the address tables (e.g., by expanding the level 1 table).

Virtual volume layer 310 initially creates virtual volume 400 with only a blank level 1 table. As data is written to virtual volume 400, virtual volume layer 310 adds the necessary level 2 and level 3 tables and LD data pages. If an entry in a table is "empty" so it does not lead to an address table or an LD data page, virtual volume layer 310 stores in that entry a pointer to a special zero LD region 416 having all zeroes. Special zero LD region 416 is a common virtual storage space with all zeroes shared by any VV block having all zeroes. Thus, a read of such a VV block causes logical disk layer 314 to return all zeroes.

Figure 6:
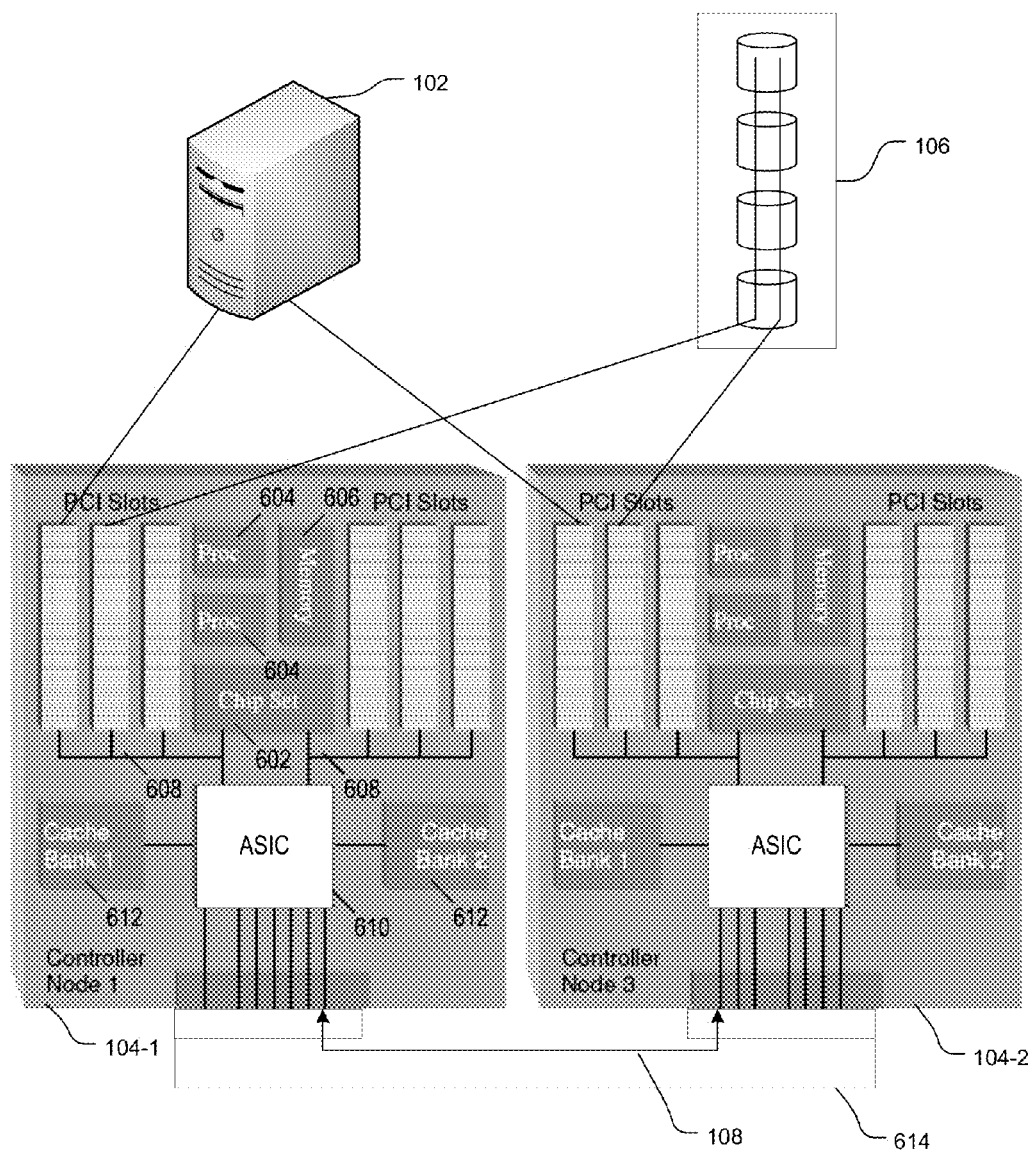
FIG. 6 illustrates the hardware of a storage server in FIG. 3 in one embodiment of the invention.

FIG. 6 illustrates the hardware of controller nodes 104-1 and 104-2 in one embodiment of the invention. The hardware of node 104-1 includes a chipset 602 that connects CPUs 604, control cache memories 606 for the CPUs, PCI buses 608, an ASIC 610 on PCI buses 608, and data cache memories 612 for the ASIC. CPUs 604 execute operating system 302 (FIG. 3) and process the control operations described above. ASIC 610 handles the data movement between PCI buses 608, data cache memories 612, and the high-speed links to other controller nodes. In one embodiment, link 108 between controller nodes 104-1 and 104-2 is part of a full-mesh backplane 614 (e.g., a passive circuit board). Host computer 102 and physical disk drives 106 are connected to PCI buses 608 so they can read from or write to data cache memories 612 and control cache memories 606. Similarly, the hardware of node 104-2 includes a chipset that connects CPUs, control cache memories for the CPUs, PCI buses, an ASIC on PCI buses, and data cache memories for the ASIC.

Figure 7:
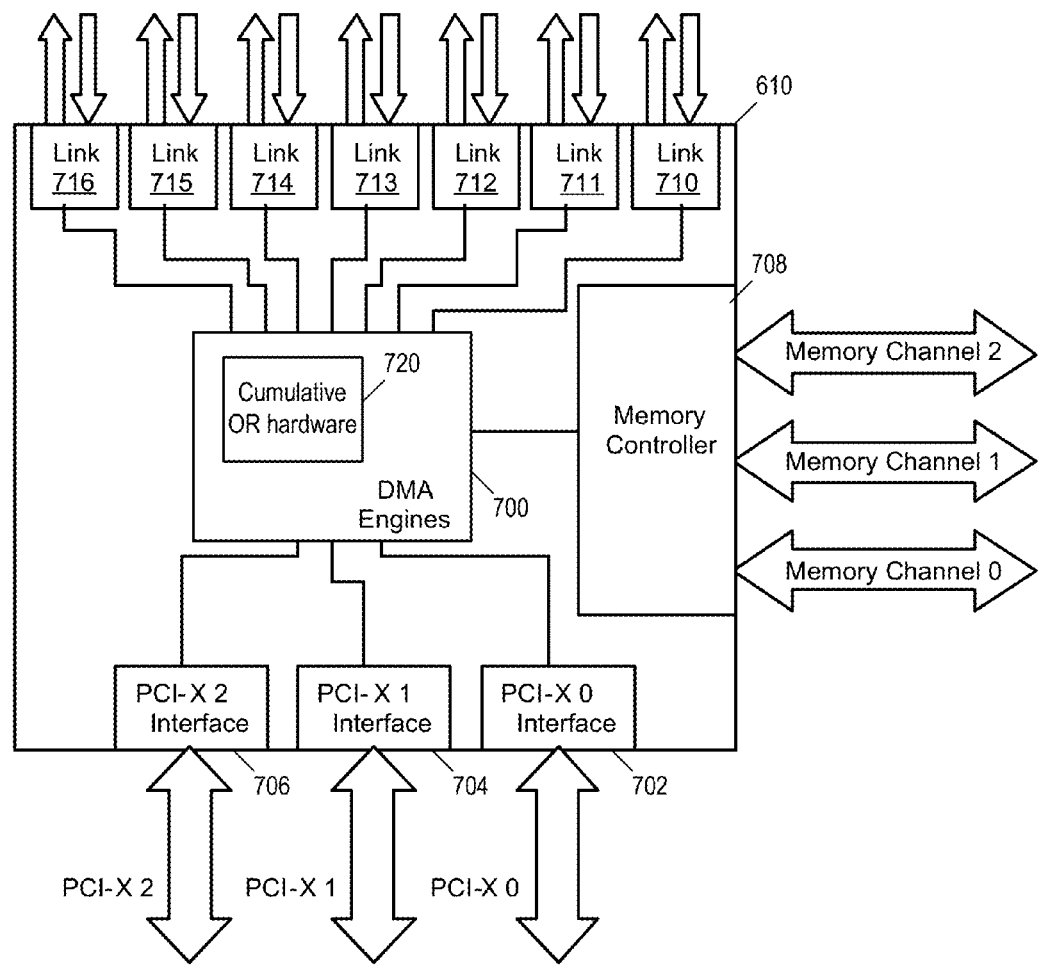
FIG. 7 illustrates the ASIC of a controller node in FIG. 6 in one embodiment of the invention.

FIG. 7 illustrates ASIC 610 of controller node 102-1 in one embodiment of the invention. ASIC 610 includes DMA engines 700 that move data between PCI interfaces 702, 704, and 706 to PCI buses 608, a memory controller 708 for accessing data cache memories 612, and link interfaces 710 to 716 for accessing other controller nodes. Each DMA engine 700 includes a Cumulative OR hardware 720 that performs a bit-wise logical OR of each word in a data block and returns the resulting word to the data cache memories 612 or control cache memories 606. In the method disclosed in FIG. 9, Cumulative OR hardware 720 is used to detect any incoming block of write with all zeroes.

Figure 8:
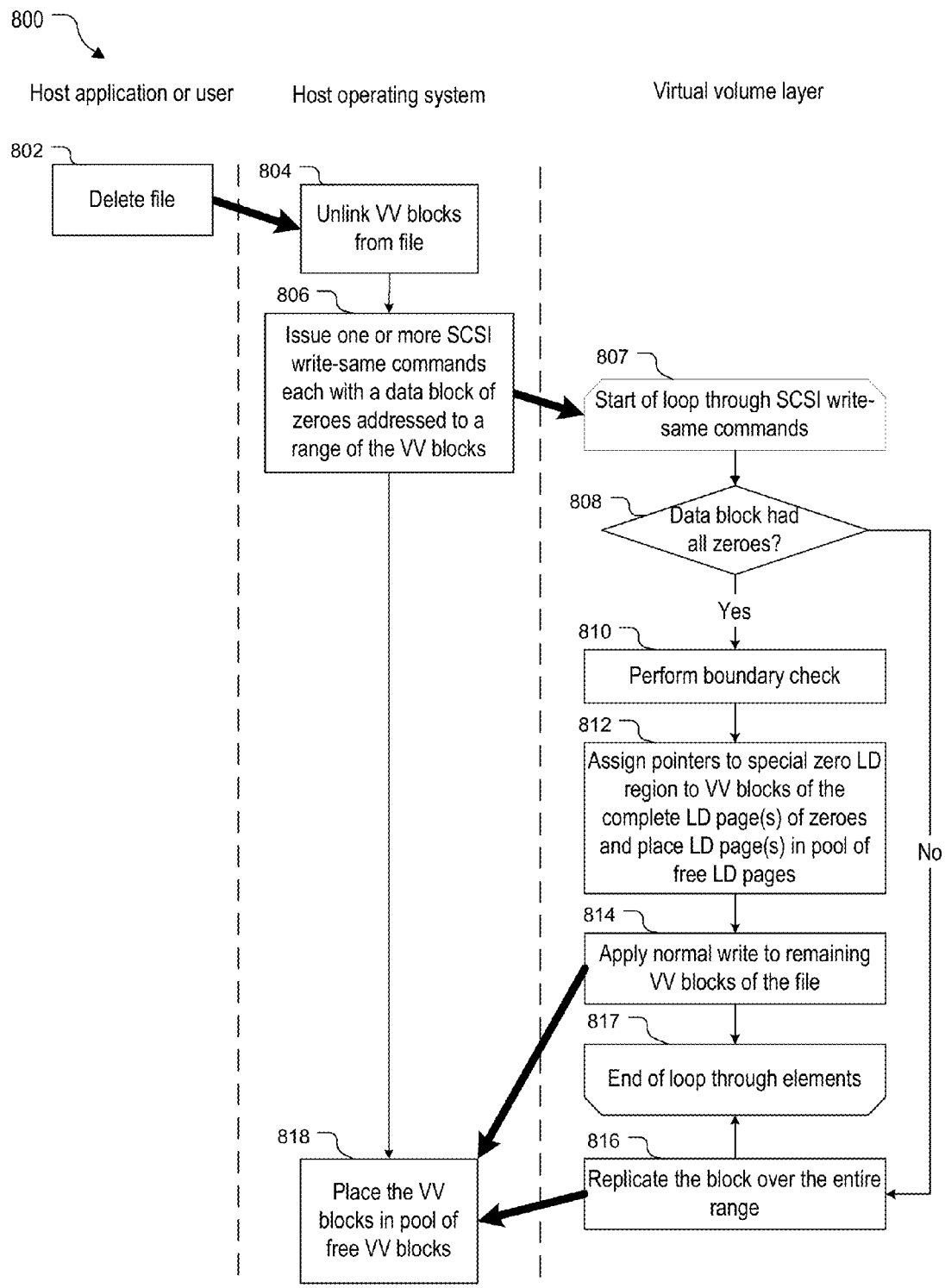
FIG. 8 illustrates a method for the system of FIG. 3 to recover unused storage space in a thin-provisioned volume in one embodiment of the invention.

FIG. 8 illustrates a method 800 for using space recovery function 324 (FIG. 3) of host operating system 320 to eliminate unnecessary usage of storage space in a TPVV in one embodiment of the invention.

In step 802, a host application or a user on host computer 102 causes host operating system 320 to delete file 328 (FIG. 3).

In step 804 responding to step 802, host operating system 320 deletes file 328 by causing host file system 322 to unlink the file from the mapped VV blocks. Note that host file system 322 does not return these VV blocks to pool 329 because another host application or user may pull these VV blocks from the pool and start to write to them before subsequent steps 806 to 816 are completed. Step 804 is followed by step 806.

In step 806, space recovery function 324 in host operating system 320 detects the deletion of file 328 in file system 322 and issues one or more SCSI write-same commands to write zeroes the VV blocks previously mapped to file 328. Each SCSI write-command has a data block of zeroes addressed to a range of VV blocks (a starting block number and a length) that forms at least part of file 328. Multiple SCSI write-same commands are needed when file 328 is formed from non-contiguous ranges of VV blocks. As described before, the block numbers used by file system 322 may not be identical to the VV LBAs so the starting block number may need to be converted to a VV LBA by adding an offset. Step 806 is followed by step 818 (described after steps 807 to 817).

In step 807 responding to step 806, a handler for the SCSI write-same command (hereafter "write-same handler") in the virtual volume layer 310 starts to loop through the SCSI-write commands received from host operating system 320. Step 807 is followed by step 808.

In step 808, the write-same handler determines if the data block in the SCSI write-same command has all zeroes. If so, step 808 is followed by step 810. Otherwise the write-same handler flags the SCSI write-same command and step 808 is followed by step 816.

In step 810, the write-same handler performs a boundary check to the range of the SCSI write-same command to determine the VV blocks that are mapped to one or more complete LD data pages. This is because virtual volume layer 310 allocates storage space in the units of LD data pages so the volume layer may only return complete LD pages in to LD page buffer pool 412 or 414. Step 810 is followed by step 812.

In step 812, the write-same handler assigns pointers to the VV blocks mapped to complete data pages to special zero LD region 416 (FIG. 4). This frees the LD data pages previously mapped to these VV blocks and their underlying storage space. In response, virtual volume layer 310 places these LD pages in LD page buffer pool 412 or 414 so they may be assigned to new data.

In step 814, the write-same handler passes the remaining range or ranges of VV blocks that are not part of a complete LD page, the single data block of zeroes, and a flag to a normal write handler in virtual volume layer 310. The flag indicates to the normal write handler that it must replicate the data block to the range or ranges of VV blocks. Step 814 is followed by step 817.

In step 816, the write-same handler passes the range or ranges of VV blocks, the single data block of data that is not all zeroes, and a flag to the normal write handler. The flag indicates to the normal write handler that it must replicate the data block to the range or ranges of VV blocks. Step 816 is followed by step 817.

In step 817, the write-same handler loops to step 807 if there is a SCSI write-same command that has not been processed. Otherwise the write-same handler terminates.

In step 818 responding to step 814 or 816, space recovery function 324 in host operating system 320 places the VV blocks of file 328 to pool 329 of they can be assigned to new data. Space recovery function 324 performs this after host computer 102 receives one or more replies for the SCSI write-same commands from data storage server 100 indicating that the SCSI write-same has completed.

Figure 9:
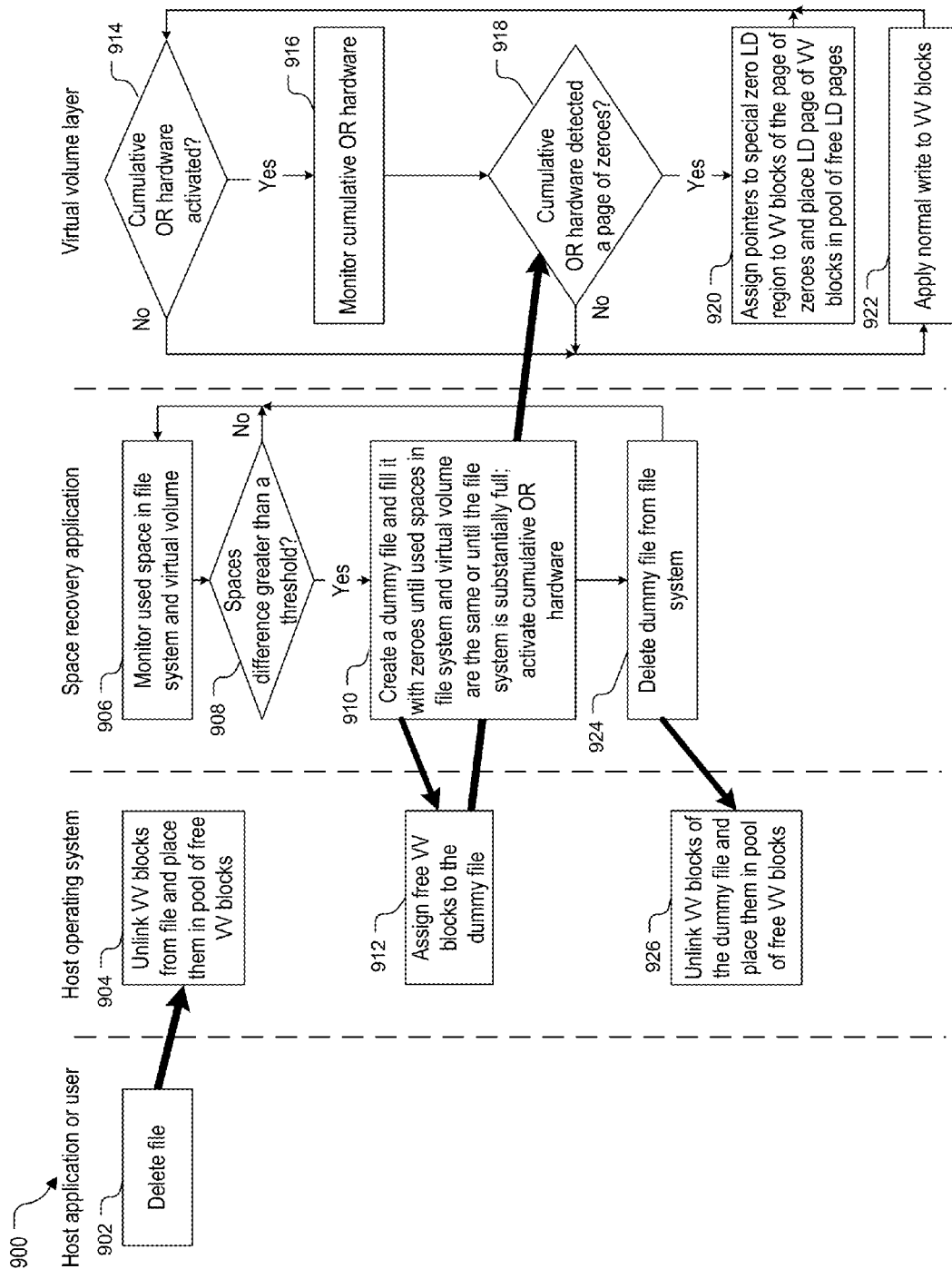
FIG. 9 illustrates another method for the system of FIG. 3 to recover unused storage space in a thin-provisioned volume in another embodiment of the invention.

FIG. 9 illustrates a method for using space recovery application 326 (FIG. 3) in host computer 102 to eliminate unnecessary usage of storage space in a thin-provisioned virtual volume in one embodiment of the invention.

In step 902, a host application or a user on host computer 102 causes host operating system 320 to delete file 328 (FIG. 3).

In step 904 responding to step 902, host operating system 320 deletes file 328 by causing host file system 322 to (1) unlink the file from VV blocks and (2) place the VV blocks to pool 329 so they can be assigned to new data.

In step 906, space recovery application 326 activates and monitors the used space in the TPVV and the used space in host file system 322. Space recovery application 326 can be activated by a user or automatically. Space recovery application 326 can activate automatically when it does not impact the performance of storage server 100. For the used space in the TPVV, space recovery application 326 queries storage operating system 302-1 in controller node 104-1. For the used space in host file system 322, space recovery application 326 queries the host operating system 320. Step 906 is followed by step 908.

In step 908, space recovery application 326 determines if the used space in the TPVV is greater than the used space in host file system 322 by a threshold amount. If so, then there are unnecessary usage of storage space in the TVPP and step 908 is followed by step 910. Otherwise step 908 loops back to step 906 where space recovery application 326 continues to monitor the used space in the virtual volume and the used space in host file system 322.

In step 910, space recovery application 326 creates one or more dummy files 330 (FIG. 3) and writes zeroes to the file until either (1) the used space in host file system 322 matches the used space in the TPVV plus the total size of dummy files 330 or (2) the host file system becomes substantially full (e.g., within a safety margin of being completely full). Host file system 322 may become substantially full from space recovery application 326 writing dummy files 330, other applications consuming space in the host file system, or a combination thereof. The safety margin ensures that host computer 102 can write to the host file system 322 between the times when dummy files 330 are completed and when the dummy files are deleted in step 924 described later. Space recovery application 326 may include a further safeguard to ensure host computer 102 can write to host file system 322. Space recovery application 326 may temporality pause the writing of zeroes to dummy files 330 when it detects other applications are consuming space in host file system 326 at a rate above a threshold.

Space recovery application 326 also instructs storage operating system 302 in controller node 104-1 to activate Cumulative OR hardware 720 in ASIC 610. Typically the incoming write data are buffered by ASIC 610 in data cache memories 612. Space recovery application 326 causes Cumulative OR hardware 720 to OR each incoming page of write data. A page of zeros is detected if the result of the Cumulative OR operation is zero. Space recovery application 326 can pause the write of dummy file 330 and the action of Cumulative OR hardware 720 when they impact the performance of storage server 100 and resume both at a later time. Step 910 is followed by step 924.

In step 912 responding to step 910, host operating system 320 causes file system 322 to retrieve free VV blocks from pool 329 and map them to dummy file 330. These available VV blocks include those that were mapped to deleted files.

In step 914, virtual volume layer 310 determines if Cumulative OR hardware 720 is activated. If so, step 914 is followed by step 916. Otherwise step 914 is followed by step 922.

In step 916, virtual volume layer 310 monitors Cumulative OR hardware 720 for detecting an incoming page of write data with all zeroes. Step 916 is followed by step 918.

In step 918 responding to step 912, virtual volume layer 310 determines if the Cumulative OR hardware 720 has detected an incoming page of write data with all zeroes. If so, step 918 is followed by step 920. Otherwise step 918 is followed by step 922.

In step 920, virtual volume layer 310 assigns pointers to the VV blocks mapped to the complete page of zeroes to special zero LD region 416 (FIG. 4). This frees any LD data page previously mapped to these VV blocks and its underlying storage space. In response, virtual volume layer 310 places the LD page in LD page buffer pool 412 or 414 so they may be assigned to new data. Step 920 loops back to step 914 where it again determines if Cumulative OR hardware 720 is activated.

In step 922, virtual volume layer 310 performs a normal write. Step 922 loops back to step 914 where it again determines if Cumulative OR hardware 720 is activated.

In step 924 that follows step 910, space recovery application 326 causes host operating system 320 to delete dummy file 330 from host file system 322. Step 924 loops back to step 906 where it continues to monitor the used space in the TPVV and the used space in host file system 322.

In step 926 responding to step 924, host operating system 320 causes host file system 322 to delete dummy file 330 by (1) unlinking the dummy file from VV blocks and (2) placing the VV blocks to pool 329 so they can be assigned to new data.

Various other adaptations and combinations of features of the embodiments disclosed are within the scope of the invention. Numerous embodiments are encompassed by the following claims.

What is claimed is:

1. A method for a host computer to recover unused storage space in a thin-provisioned volume presented by a storage server, the host computer mapping a file to logical blocks in the thin-provisioned volume, the storage server mapping the logical blocks to storage space in the storage server, the method comprising:
   (1) the host computer deleting the file from the host computer by unlinking the file from the logical blocks but without returning the logical blocks to a pool of free logical blocks to be mapped to files by the host computer;
   (2) in response to (1), the host computer issuing at least one SCSI write-same command to the thin-provisioned volume, the at least one SCSI write-same command comprising a data block of all zeroes addressed to at least some of the logical blocks, the at least one SCSI write-same command causing the storage server to (a) map the at least some of the logical blocks to a common storage space of all zeroes shared by any logical block with all zeroes and (b) free at least some of the storage space previously mapped to the logical blocks; and (3) in response to (2), the host computer returning the logical blocks to the pool of free logical blocks.

2. A method for a storage server to recover unused storage space in a thin-provisioned volume presented to a host computer, the host computer mapping a file to logical blocks in the thin-provisioned volume, the storage server mapping the logical blocks to storage space in the storage server, the method comprising:

the storage server receiving from the host computer at least one SCSI write-same command to the thin-provisioned volume, the at least one SCSI write-same command comprising a data block addressed to a range of the logical blocks;

the storage server determining if the data block of the at least one SCSI write-same command comprises all zeroes; and when the data block of the at least one SCSI write-same command comprises all zeroes, the storage server (a) mapping at least part of the range of the logical blocks to a common storage space of all zeroes shared by any logical block with all zeroes and (b) freeing at least some of the storage space previously mapped to the logical blocks.

3. The method of claim 2, further comprising:

prior to said mapping the at least some of the logical blocks, determining the at least part of the range of the logical blocks comprise one or more complete pages, wherein the storage server allocates storage in the thin-provisioned volume in units of pages; and applying normal write to another range of the logical blocks comprise less than one complete page.

4. A method for an application in a host computer to recover unused storage space in a thin-provisioned volume presented by a storage server, the host computer comprising a host file system having a pool of free logical blocks that are not mapped to any files, the free logical blocks comprising logical blocks from the thin-provisioned volume, the storage server mapping at least some of the logical blocks to storage space in the storage server, the method comprising:

determining a first amount of used space in the thin-provisioned volume; and determining a second amount of used space in the host file system;

when the first amount is greater than the second amount by a threshold amount:

creating at least one dummy file;

writing zeroes to the at least one dummy file in the host file system, said writing causing (1) the host file system to map at least some of the free logical blocks to the at least one dummy file and (2) the storage server to (a) map the at least some the logic blocks to a common storage space of all zeroes shared by any logical block with all zeroes and (b) free the storage space previously mapped to the at least some of the logical block; and after the dummy file is written, deleting the dummy file from the host file system.

5. The method of claim 4, wherein said writing zeroes to at least one dummy file continues until the first and the second amounts are equal or the host file system is within a safety margin being completely full.

6. The method of claim 5, further comprising temporally pausing said writing zeroes to at least one dummy file when one or more applications are consuming space in the host file system at a rate above a threshold.

7. The method of claim 4, further comprising:

activating a hardware in the storage server to OR each incoming page of incoming data to detect any page of zeroes from the host computer, wherein the storage server allocates storage in the thin-provisioned volume in units of pages.

8. A method for a storage server to recover unused storage space in a thin-provisioned volume presented to a host computer, the host computer mapping files to logical blocks in the thin-provisioned volume, the storage server mapping the logical blocks to storage space in the storage server, the method comprising:

the storage server determining if a hardware in the storage server detects a page of zeroes in an incoming write from the host computer to a page of logical blocks in the thin-provisioned volume, wherein the storage server allocates storage in the thin-provisioned volume in units of pages;

when the hardware detects the page of zeroes in the incoming write from the host computer to a page of logical blocks in the thin-provisioned volume, the storage server (a) mapping those logical blocks in the page to a common storage space of all zeroes shared by any logical block with all zeroes and (b) freeing at least some of the storage space previously mapped to the logical blocks; and when the hardware is not activated or the hardware does not detect the page of zeroes in the incoming write from the host computer, applying normal write.

* * * * *

UNITED STATES PATENT AND TRADEMARK OFFICE
CERTIFICATE OF CORRECTION

| | | |
|---|---|---|
| PATENT NO. | : 8,694,563 B1 | Page 1 of 1 |
| APPLICATION NO. | : 12/426224 | |
| DATED | : April 8, 2014 | |
| INVENTOR(S) | : Douglas J. Cameron et al. | |

It is certified that error appears in the above-identified patent and that said Letters Patent is hereby corrected as shown below:

In the Claims:

In column 10, line 5, in Claim 4, after "some" insert -- of --.

Signed and Sealed this
Twenty-sixth Day of August, 2014

Michelle K. Lee
*Deputy Director of the United States Patent and Trademark Office*